United States Patent Office 3,186,860
Patented June 1, 1965

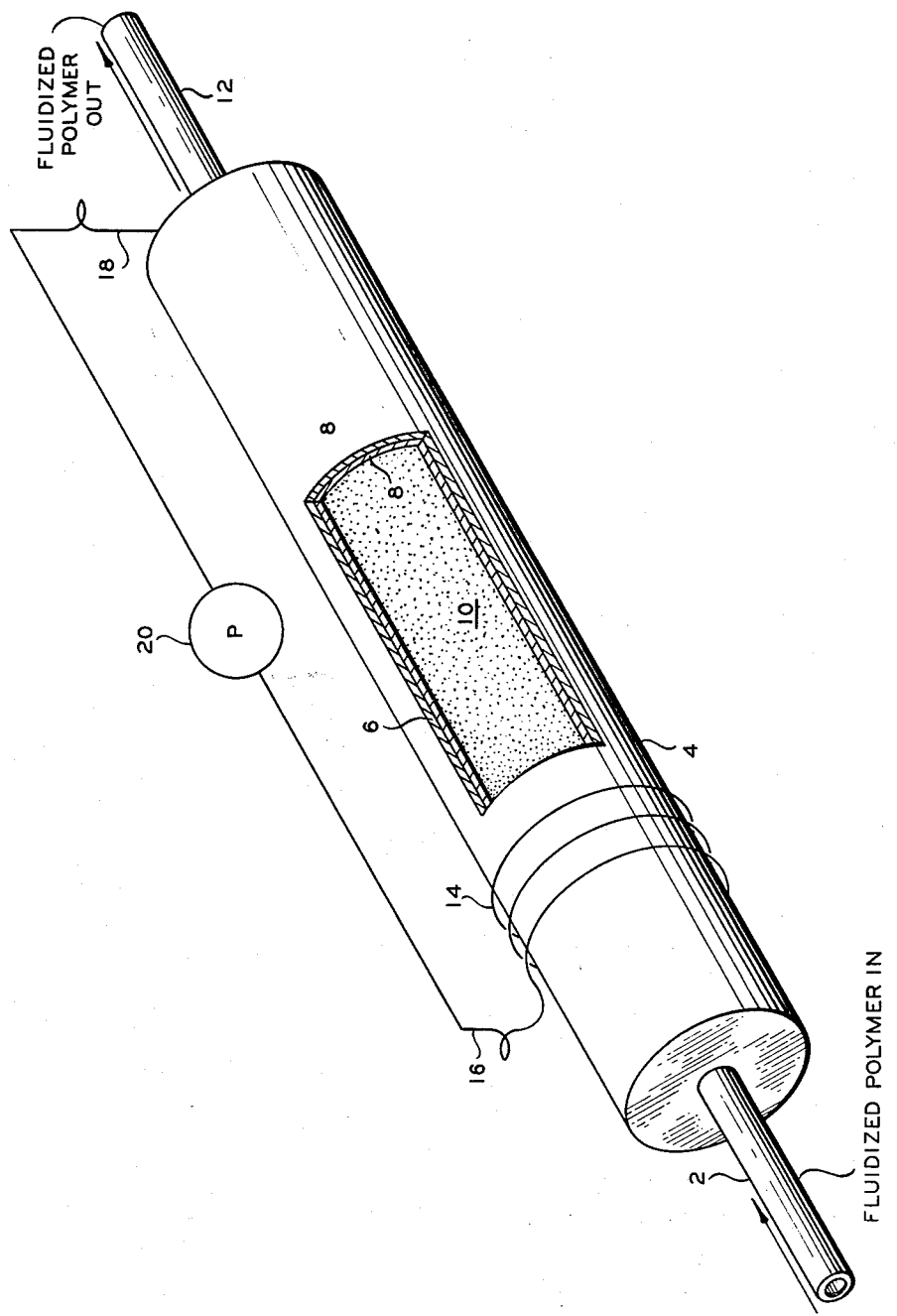

3,186,860
PROCESS FOR COATING SURFACES
Rufus Vernon Jones, Bartlesville, Okla., assignor to Phillips Petroleum Company, a corporation of Delaware
Filed Nov. 13, 1956, Ser. No. 621,899
8 Claims. (Cl. 117—18)

This invention relates to a method for coating surfaces with thermoplastic materials. In one aspect, it relates to a method for coating surfaces with finely subdivided thermoplastic materials maintained in a fluidized state. In another aspect, it relates to a method for coating surfaces heated by induction with fluidized finely subdivided thermoplastic materials.

Thermoplastics frequently find use as protective coatings for metals and other materials, particularly when such materials are utilized in the construction of pipes, vessels, shields, etc., for use in chemical and petroleum processes. It is a definite advantage when utilizing these construction materials to be able to provide a continuous uniform coating on exposed surfaces whereby a maximum degree of protection against erosion, corrosion, etc., is provided. In some instances, this does not present a problem, however, frequently, the surfaces to be coated are not visible to the eye or are present in equipment which is difficult or impossible to reach by conventional coating methods.

It is an object of this invention to provide an improved process for applying protective coatings to surfaces.

Another object of this invention is to provide an improved process for coating surfaces with thermoplastic materials.

Still another object of this invention is to provide an improved process for applying a continuous uniform film of thermoplastic material to a surface heated by induction.

These and other objects of the invention will become more readily apparent from the following detailed description and discussion.

The aforedescribed objects are achieved broadly by contacting a heated surface with a fluidized finely subdivided thermoplastic material whereby a coating is deposited on the surface, deposition of the thermoplastic in this manner being provided by heating the surface by induction. It has been found that the use of induction heating makes it possible to obtain a continuous uniform coating of thermoplastic material. In addition to providing a superior film, this method makes it possible to reach out-of-the-way and irregular surfaces which cannot be reached by ordinary coating methods.

The process of this invention is applicable in general to the coating of materials which are capable of being heated by induction, such as metals like iron, copper, aluminum, etc.; alloys such as steel, etc. The coating material employed can be any thermoplastic material which is a solid at ambient temperatures and which is capable of being fluidized, such as, for example, acrylic ester polymers, such as methyl methylacrylate polymer; cellulose resins such as cellulose acetate, cellulose acetate butyrate, ethyl cellulose, etc.; olefin polymers such as polymers of ethylene, propylene, butylene, etc.; polymers of diolefins such as butadiene; copolymers of olefins and diolefins such as isoprene, chlorinated polymers such as tetrafluorethylene, trifluorchloroethylene, etc.; vinyl resins such as polyvinyl acetate, polyvinyl chloride, vinyl chloride acetate copolymer, polyvinyl butyral, vinylidene chloride; and other thermoplastic materials. These materials and their methods of preparation are well known to those skilled in the art.

In one embodiment of the invention, the coating material employed is a solid olefin polymer, such as a polymer of ethylene. A preferred method of preparing polymers of olefins is described in detail in a copending application of Hogan and Banks, Serial No. 573,877, filed March 26, 1956, now Patent No. 2,825,721. This particular method utilizes a chromium oxide catalyst, preferably containing hexavalent chromium, associated with silica, alumina, zirconia, thoria, and composites thereof. In the method of the Hogan et al. application, olefins can be polymerized in the presence or absence of a hydrocarbon diluent, for example, an acyclic, alicyclic or aromatic (less frequently) hydrocarbon which is inert and in which the formed polymer is soluble. The reaction is ordinarily carried out at a temperature between about 150° F. and about 450° F. and under a pressure sufficient to maintain the diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at ambient temperatures.

Other, less advantageous catalysts include various organometallic compounds such as triethylaluminum, plus titanium tetrachloride, mixtures of ethylaluminum halides with titanium tetrachloride, and the like. Still another group of catalysts which find use in the preparation of olefin polymers comprise a halide of a group IV metal, such as for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

In carrying out the invention, a thermoplastic solid, such as a polymer of ethylene, in finely subdivided form is brought into contact in a fluidizing state with the surface to be coated, for example, the interior of a cylindrical pipe. The pipe is heated uniformly by an electric current induced by a coil or other suitable induction heating means, communicating with a suitable power source. When the temperature of the pipe surface reaches the softening point of the polymer, the particles contacting the surface are deposited thereon in a melted state whereby a uniform continuous film is built up. When a film of sufficient thickness has been obtained, heating is terminated and contact between the fluidized polymer and the pipe is discontinued.

Fluidization of the thermoplastic material is provided in a conventional manner by finely subdividing the thermoplastic, usually to a size between about 1 and about 200 microns and entraining the particles in a fluidizing gas. The fluidizing gas can be any material which is inert to the system, such as nitrogen; low molecular weight hydrocarbons, such as methane, ethane, ethylene; carbon monoxide, carbon dioxide, etc. The gas velocity required for fluidization varies depending on the size and density of the solids and the concentration of solids desired in the fluidized mass. Usually, the superficial gas velocity is maintained between about 0.5 and about 30 feet per second, thereby providing a fluidized mass having a density of between about 5 and about 20 pounds of thermoplastic solids per cubic foot.

The temperature of the surface to be coated is maintained between about 25 and about 100° F. above the softening point of the thermoplastic material, depending on the particular thermoplastic material employed. The softening point of the coating material can vary over a wide range, namely, between about 150° and about 350° F., depending on the particular material employed. For example, when coating with an olefin polymer such as ethylene, the softening point varies from about 260° F. with a polymer of about 23,000 molecular weight to about 266° F. with a polymer of about 92,000 molecular weight.

Films of varying thickness can be deposited in the process of this invention, varying in depth from less than about 0.001 inch to as high as about 0.25 inch. The time required to effect deposition of the film desired depends principally on the depth of the film and on the density of the fluid mass in contact with the surface to be coated. The time required to deposit a film having the depth range given is usually between about 1 min. and about 60 min.

Heating of the material to be coated is provided by inducing an electric current in said material by means of a conventional induction heating means. As an example, a suitable apparatus for use in connection with cylindrical members such as pipes, is shown in Patent No. 2,176,103, entitled "Coreless Induction Heater," issued October 17, 1939, to Bela Raney. Similar apparatus can be used in the coating of objects having other shapes, such as bars, sheets, etc.

In order to assure fluidization of the thermoplastic particles which do not contact the surface to be coated, it is necessary that the main fluidized body be kept below the softening temperature of the coating material. When coating the interior of a cylindrical member, such as a pipe, temperature control can be obtained by maintaining a continuous flow of solids and fluidizing gas past the heated surface. If the solids and/or fluidizing gas are recirculated, a suitable cooling means can be provided. When other types of surfaces are coated similar expedients can be used to hold the fluidized mass at a suitable temperature level.

In order to more clearly describe the invention and provide a better understanding thereof, reference is had to the accompanying drawing which is an isometric view of a pipe partially in cross-section, with means for introducing and withdrawing fluidized thermoplastic material and means for inducing an electric current in said pipe. Referring to the drawing, solid ethylene polymer, having a particle size distribution between about 10 and about 100 microns, is fluidized in nitrogen and introduced through conduit 2 to pipe 4. Upon entering the pipe, the fluidizing gas expands, filling the pipe throughout with nitrogen and solids whereby a fluidized mass is provided having a density of about 20 pounds per cubic foot. Withdrawal of fluidized polymer is provided in the opposite end of the pipe through conduit 12. The ends of the pipe are sealed in a suitable manner to prevent flow of gases and solids other than through conduits 2 and 12. After the flow of nitrogen and fluidized polymer has been established, the pipe is heated by induction, the heat being provided by a current induced in the pipe by means of coil 14, the terminals 16 and 18 of which are attached to a suitable power source 20.

The induction heating is controlled so that the temperature of the inner surface of the pipe is gradually increased up to a point which is about 35° F. above the softening point of the ethylene polymer. When this temperature is reached, particles of polymer contacting the inner surface of the pipe are melted and adhere to said surface. Fluidization of polymer particles not in contact with the pipe surface is maintained by virtue of the lower temperature present in the flowing nitrogen gas which maintains the solids therein below the softening point of the polymer. After a suitable period of time has elapsed to provide a film of the desired thickness, the heating is discontinued and the fluidized polymer is removed from the pipe. The interior of the pipe just before film deposition is terminated is shown by the cut-away section of the drawing, including the pipe wall 6, the ethylene polymer film 8 and fluidized particles of ethylene polymer 10.

The method of this invention has been illustrated in the preceding embodiment by the application of a film of ethylene polymer to the interior surface of a metal pipe. This is not, however, intended in any way to limit the scope of the invention. Thus, as previously stated, other thermoplastic materials can be used including olefin polymers in general, and these materials can be applied to any or all types of surfaces, including bars, plates and surfaces of irregular shape and form. Thus, if it is desired, for example, to coat the surface of a plate, this can be accomplished by immersing the plate into a fluidized bed of thermoplastic solids. When treating materials other than plates or cylinders, contact of the thermoplastic material with the surface or surfaces to be coated can be provided in a manner suitable to provide the surface desired, as would be obvious to those skilled in the art.

The following data is presented in illustration of an application of an embodiment of the invention on a commercial scale.

*Example*

A solid ethylene polymer is prepared in the presence of a chromium oxide catalyst, containing hexavalent chromium, having a composition of about 2.5 weight percent chromium and about 2.2 weight percent hexavalent chromium, associated with silica-alumina, prepared by impregnating silica-alumina with chromium trioxide solution, followed by drying and activation for several hours at temperatures up to 950° F.

The operating conditions utilized in the formation of the polymer are as follows:

| | |
|---|---|
| Ethylene feed rate _____lbs./hr__ | 9 |
| Cyclohexane feed rate _____lbs./hr__ | 54 |
| Polymer concentration in reactor _____wt. percent__ | 9 |
| Catalyst concentration in reactor _____do____ | 0.3 |
| Pressure _____p.s.i.g__ | 420 |
| Temperature _____° F__ | 270–280 |

The above polymer is finely subdivided to provide an average particle size of about 20 microns, fluidized in nitrogen gas, introduced to one end of a standard stainless steel 8 inch pipe and withdrawn from the other end. Heating of the pipe during the passage of the polymer solids is provided by inducing a flow of current therein, which is sufficient to raise the temperature of the inner surface of the pipe above the softening temperature of the polymer, whereupon deposition of polymer in the form of a film takes place. The conditions obtaining during this process are as follows:

| | |
|---|---|
| Temperature of the metal surface _____° F__ | 300 |
| Superficial nitrogen velocity _____ft./sec__ | 5 |
| Density of fluidized polymer _____lbs./cu. ft__ | 10 |

The process is continued over a time period of about 10 min. whereby a continuous uniform film having a depth of about 0.01 in. is deposited on the inner surface of the pipe.

Having thus described the invention by providing a specific example thereof, it is to be understood that no undue limitations or restrictions are to be employed by reason thereof and that many modifications and variations are within the scope of the invention.

I claim:

1. Method for surface coating metal objects which comprises forming a fluidizable mass of finely divided solid particles of a fusible organic resinous coating material, said mass being at least as deep as the portion of said object intended to be coated; fluidizing said mass by passing a stream of an inert gas at a fluidizing rate upwardly through said mass while maintaining the average temperature of the mass below the softening temperature of the solid particles therein; contacting a metal object to be coated with said fluidized mass; inductively heating said metal object while it is in contact with said fluidized mass by subjecting it to the influence of an alternating high frequency magnetic field to generate sufficient heat on the surface of said object to fuse contacting and contiguous particles of said organic resinous material and form a coated, enveloping layer of said fused particles on the surface of said metal object; and then removing said coated object from contact with said fluidized mass and the influence of said magnetic field and cooling it to a normal temperature.

2. A process which comprises coating the inside of a pipe with a thermoplastic material, said pipe having been fabricated from material capable of being heated by induction, which process comprises maintaining a fluidized mass of said thermoplastic material in particulate form within said pipe and in contact with the inner walls thereof and inductively heating the surfaces to be coated within said pipe above the softening point of the thermoplastic material during the contacting of said fluidized mass with the surfaces to be coated.

3. A process for coating the interior surface of a metal pipe with a thermoplastic coating material, which process comprises maintaining within said pipe and in contact with the inner walls thereof a fluidized mass of said thermoplastic material in particulate form and inductively heating the inner walls of said pipe above the softening point of said thermoplastic material during the contacting of said fluidized mass with said inner walls to effect adherence of said thermoplastic material to said inner walls and coating of said walls by a continuous coating of said thermoplastic material.

4. A process according to claim 3 wherein said thermoplastic material is a normally solid polymer of an olefin.

5. A process according to claim 4 wherein said polymer is a polymer of ethylene.

6. A process according to claim 3 wherein said fluidized mass of said thermoplastic material is maintained fluidized by passage of an inert gas therethrough.

7. A process for coating the interior surface of a stainless steel pipe with a solid polymer of ethylene, which process comprises maintaining in contact with the interior walls of said pipe a fluidized mass of said polymer in particulate form, said mass having a density of between about 5 and about 20 lbs. per cu. ft. with the particle size being in the range of between about 1 and about 200 microns with said particles being entrained in nitrogen gas, and inductively heating said interior walls above 260° F. during the contacting of said fluidized mass with said interior walls to effect adherence of said polymer to said interior walls and coating of said walls with a continuous coating of said polymer.

8. A process according to claim 7 wherein said fluidized mass of said polymer is maintained fluidized by passage of said nitrogen through said pipe.

References Cited by the Examiner

UNITED STATES PATENTS

| | | | |
|---|---|---|---|
| 1,726,431 | 8/29 | Fourment | 117—17 X |
| 2,448,008 | 8/48 | Baker. | |
| 2,663,652 | 12/53 | Railing | 117—21 |
| 2,719,093 | 9/55 | Voris | 117—21 X |
| 2,785,082 | 3/57 | Clough et al. | 117—22 |
| 2,844,489 | 7/58 | Gemmer | 117—23 X |
| 2,880,109 | 3/59 | Current et al. | 117—101 X |

FOREIGN PATENTS

| | | |
|---|---|---|
| 579,442 | 8/46 | Great Britain. |
| 690,384 | 4/53 | Great Britain. |
| 1,100,263 | 9/55 | France. |

OTHER REFERENCES

Gemmer: "Der heutige Stand des Kunststoffspritzens und Pulversinterus," Industrie-Anzeiger, 75 Jahrgang, No. 12, Feb. 10, 1953, pp. 141–143.

WILLIAM D. MARTIN, *Primary Examiner.*

RICHARD D. NEVIUS, *Examiner.*